May 3, 1938.  R. B. SHANCK  2,115,917

PICTURE TRANSMITTING SYSTEM

Filed March 12, 1925

INVENTOR
R.B. Shanck
BY
ATTORNEY

Patented May 3, 1938

2,115,917

UNITED STATES PATENT OFFICE 2,115,917

PICTURE TRANSMITTING SYSTEM

Roy B. Shanck, Elmhurst, N. Y., assignor to American Telephone and Telegraph Company, a corporation of New York Application March 12, 1925, Serial No. 15,001

14 Claims. (Cl. 178—6)

My invention relates to signaling systems and more particularly to image producing systems.

An object of my invention is to provide a new and improved system for the transmission of signals and especially those used to produce pictures or images. Another object of my invention is to provide a system in which the images or reproduced signals will be of proper intensity unaffected by variations in the transmission equivalent of the transmitting medium. Another object of my invention is to provide for varying the frequency of a carrier current according to the shade of the elements of a picture or object and producing an image at the receiving end in shades determined by the frequency. These objects and various other objects of my invention will become apparent on consideration of a single embodiment of the invention which I have chosen for illustration in the accompanying drawing and which I now proceed to describe in the following specification. It will be understood that the following description applies to this example of the invention and that the invention will be defined in the appended claims.

Figure 1:
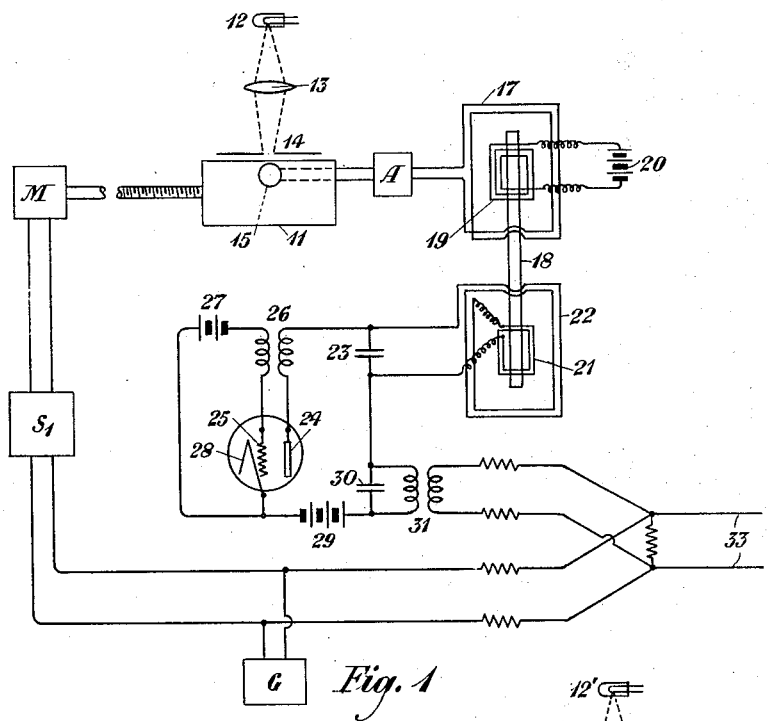
Figure 2:
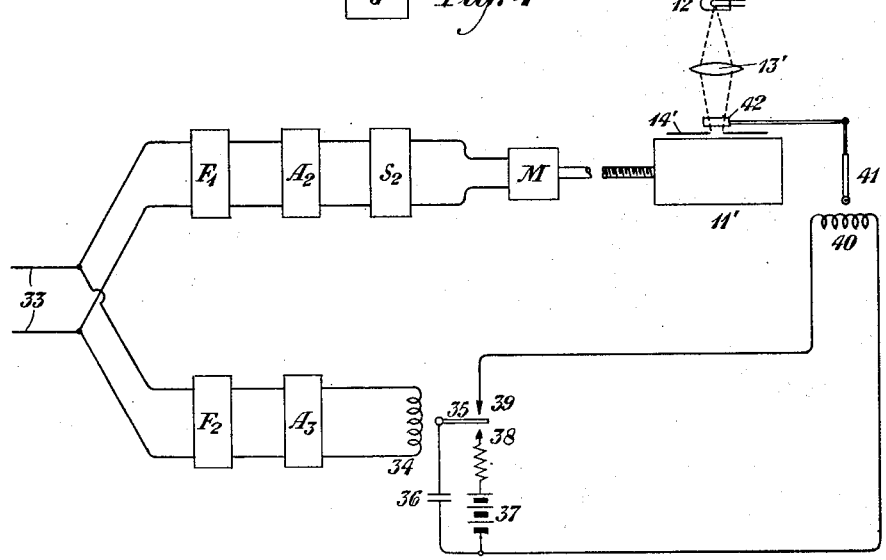

Referring to the drawing, Figure 1 is a diagram of apparatus at the transmitting end of a picture transmitting system embodying my invention, and Fig. 2 is a diagram of the corresponding apparatus at the receiving end.

Alternating current from the generator G goes by one branch circuit to the line 33 and by another branch to the speed control device S₁, whose output drives the motor M at a speed definitely related to the frequency of the source G.

The motor M rotates the glass drum 11, round which is wrapped the picture to be transmitted in the form of a semi-transparent film. This glass drum 11 is mounted on a screw-threaded shaft which has engagement with a suitable abutment so that as the drum 11 rotates it is traversed slowly along its axis. Thus, each small element of area of the film wrapped about the drum 11 passes in succession in helical order under the opening in the screen 14.

Light from the source 12 is focussed by the lens 13 on this opening in the screen 14, and this light passes through the film, in degree of intensity determined by its shade at that place, to the photoelectric cell 15. The current through the cell 15 goes to the amplifier A and this current corresponds in magnitude with the degree of light falling on the cell.

The output current from the amplifier A goes through the fixed coil 17 and the shaft 18 carries a movable coil 19 in inductive relation to the fixed coil 17 and energized by direct current from the battery 20. Accordingly, the coil 19 takes an angular position determined by the magnitude of the current in the coil 17.

The shaft 18 also carries another movable coil 21 forming one of the two elements of an adjustable inductance, with the fixed coil 22 for the other element. Hence, the resonance frequency of the inductance 21—22 and the condenser 23 is determined by the angular position of the shaft 18.

A vacuum tube oscillation generator is shown with cathode 28, plate 24 and grid 25. The oscillation frequency is determined by the adjustable inductance 21—22 and the condenser 23, and the output from this oscillator goes through the transformer 31 to the line 33.

It will be seen that the varying degree of shade in the successive elements of area of the film on the drum 11 determines a correspondingly varying current in the circuit of the photoelectric cell 15. This current is amplified and determines a corresponding angular adjustment of the shaft 18 and the adjustable inductance 21—22. Hence, the frequency of the oscillations of the oscillation-generator is determined by the degree of shade in the successive elements of area of the picture film and this current varying in frequency is put on the line 33.

At the receiving end the component of current direct from the generator G is separated out by filter F₁ to the amplifier A₂ and thence to the speed control device S₂ and motor M, which drives the drum 11' in synchronism with the drum 11. The drum 11' is also traversed by screw threads in the same way as the drum 11 so that the two drums move in all respects in synchronism. The drum 11' carries a sensitive receiving film whose elements of area pass under the opening in the screen 14' in the same order as the elements of the picture pass under the opening in the screen 14 at the sending end.

The current from the oscillation generator at the sending end, with its frequency determined by the shade of the picture elements, goes through the filter F₂ to the amplifier A₃ and thence to the polar relay whose winding is 34 and whose armature is 35. Accordingly, the armature 35 vibrates at the frequency of the oscillation generator at the sending end. On one contact 38, connection is made to charge the condenser 36 from the battery 37 and on the other contact 39 the condenser 36 discharges through the winding of the relay 40. Accordingly, the integrated current through the winding 40 varies with the frequency. The armature 41 governed by the relay 40 actuates a light valve 42 which varies the opening to the screen 14'.

Light from a source 12' is focussed by the lens 13' on this opening and, as determined by the valve 42, the quantity of light that reaches the sensitive film on the drum 11' will be a function of the frequency of the current coming in over the line 33 and charging and discharging from the condenser 36.

Thus, it will be seen that at the sending end I vary the frequency of a certain current according to the degree of shade in successive elements of a picture to be transmitted and at the receiving end I operate a light valve in accordance with that frequency and thereby expose corresponding successive elements of a sensitive film in the same order and in the degree of shade of the successive elements of the picture at the transmitting end; and that this action is not interfered with by variations in the transmission equivalent of the transmitting medium. If the transmission equivalent increases, the amplitude but not the frequency of the received current changes, the amplitude increasing. The relay 35 is, however, insensitive to amplitude variations (within the limits of operation for which it is designed) since the contact points 38 and 39 fix the amplitude of movement of the relay armature.

I claim:

1. The method of transmitting a picture electrically which consists in generating and transmitting an alternating electric current and varying its frequency in accordance with the degree of shade of successive picture elements, and at the receiving end charging intermittently and discharging a condenser at the said frequency and applying the discharge current to completely control the degree of illumination on a sensitive receiving surface.

2. The method which comprises transmitting a picture by frequency modulation of an electric current, and charging and intermittently discharging a condenser in accordance with said modulated current, and applying the discharge current to completely determine the illumination of successive elements of a sensitive picture receiving surface.

3. In a signaling system the combination of a photo-electric cell, an element having a variable inductance, an electromagnetic motor device for said element, means for varying the amplitude of the current from said cell to cause it to take various different values in succession within a range of amplitudes between fixed limits in accordance with signals to be sent, and means for applying said varying currents to said device to vary the inductance of said element in accordance with the amplitude of said current.

4. A receiving system for a frequency modulated carrier current comprising an electromagnetic relay upon which said current is impressed and the armature of which moves in response to each wave of said current, a condenser associated with said armature, a battery which is associated with said condenser by said armature when in one position to charge said condenser to different potentials over a range of potentials in accordance with the frequency of said modulated carrier current, and a control device associated with said condenser by said armature when in its other position, said control device being caused to operate differently in response to different potentials respectively to which said condenser is charged.

5. A receiving system for a frequency modulated carrier current in accordance with claim 4 comprising a resistance in series with said battery through which said condenser is charged by said battery when the latter is conductively associated with the former through said armature.

6. Image producing means comprising means for receiving electric wave energy having variations corresponding to the tone values of elemental areas of an object an image of which is to be produced, an electric condenser, means for intermittently charging said condenser in accordance with said variations of said received electric wave energy including a source of unidirectional potential and means for intermittently conductively connecting said source to said condenser, means for producing illumination the quantity of which may be controlled by variable potential supplied to said means, and an electric circuit for connecting said last mentioned means with said condenser.

7. Image producing means comprising means for receiving a modulated carrier wave having variations corresponding to the tone values of elemental areas of an object an image of which is to be produced, an electric condenser, means for intermittently charging said condenser to different potentials, respectively, in accordance with said variations of said received modulated carrier wave including a source of unidirectional potential and means for intermittently conductively connecting said source to said condenser, a circuit for discharging said condenser to set up a current having variations controlled in accordance with the variations of said received modulated carrier wave, and means for producing an image having a variety of tone values between black and white, including means controlled by said last mentioned current for producing illumination having variations extending over a range of values.

8. The method of signaling which comprises energizing a light sensitive device in accordance with the characteristics of an elemental area of a visual representation, charging a storing device to a potential which varies in accordance with the resistance of said light sensitive device, and connecting said storing device to an electrical circuit.

9. In combination, a polarized relay, a source of alternating current, circuit connections from said source to said relay to cause the armature of said relay to vibrate, a picture, means to scan the picture and produce a current which undulates in accordance with the tone values of successive elemental areas of the picture, means to amplify said undulating current, and circuit connections to vary the vibration of said relay armature in accordance with said undulating current.

10. In combination, a polarized relay, a source of alternating current, circuit connections from said source to said relay to cause the armature of said relay to vibrate, a picture, means to scan the picture and produce a current which undulates in accordance with the tone values of successive elemental areas of the picture, and circuit connections to vary the vibration of said relay armature in accordance with said undulating current.

11. A system for producing images having a variety of tone values between black and white comprising a condenser, a source of constant potential, means for intermittently charging said condenser to a potential less than that of said source and corresponding to the tone value of an elemental area of the image to be produced, and means for utilizing the charge on said condenser to control the tone value of an elemental area of an image.

12. A system for producing images having a variety of tone values between black and white comprising a condenser, means including a circuit interrupter through which said condenser is charged for charging said condenser to different potentials in succession within a range of potentials between fixed limits, said potentials being representative of tone value of elemental areas of an object, and means for utilizing the energy stored in said condenser in the production of an image.

13. The method of electro-optical image production which comprises charging a storing device for a period which varies in accordance with the tone value of an elemental area of an object of which an image is to be produced to control the potential to which the storing device is charged and associating said storing device with an electric circuit to impress thereon a potential determined by the potential to which the storing device is charged.

14. Apparatus for electro-optically producing an image of an object in a variety of tone values between fixed limits comprising a storage device, means for charging said storage device for a period determined by the tone value of an elemental area of the object to control the potential to which the storage device is charged, and image producing means, which responds differently to different potentials, respectively, over a range of potentials between fixed limits, energized in accordance with the potentials to which said storage device is charged for controlling the tone values of the image.

ROY B. SHANCK.